UNITED STATES PATENT OFFICE.

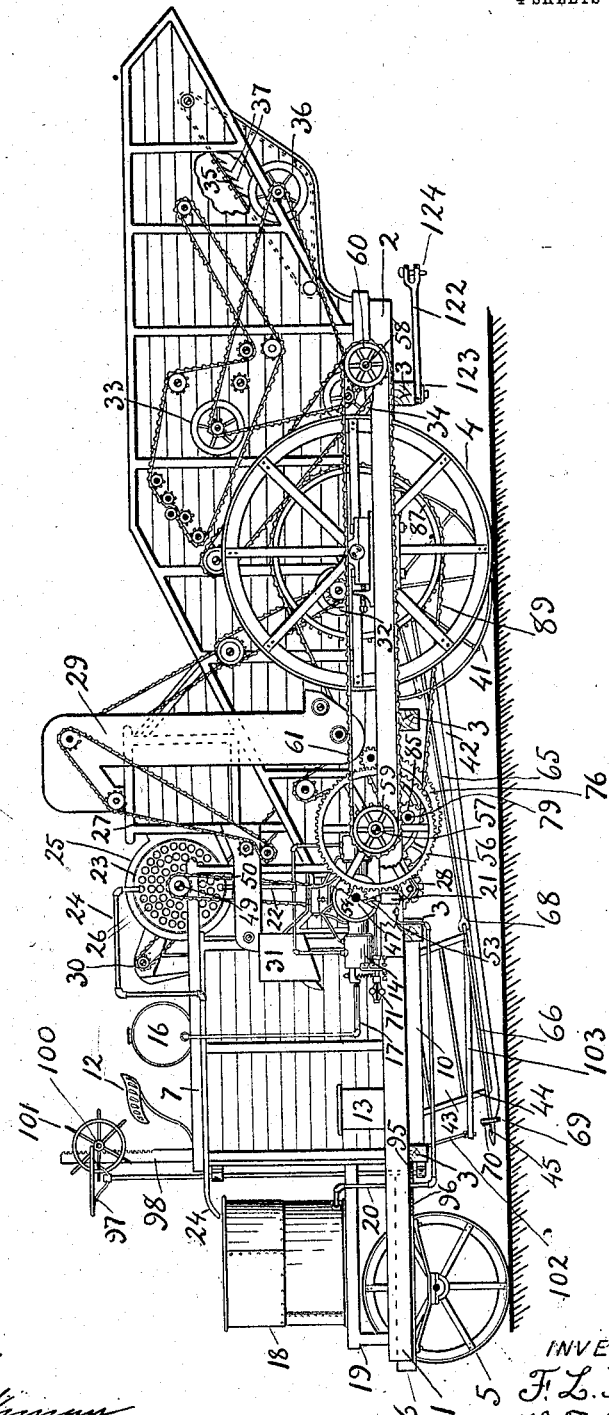

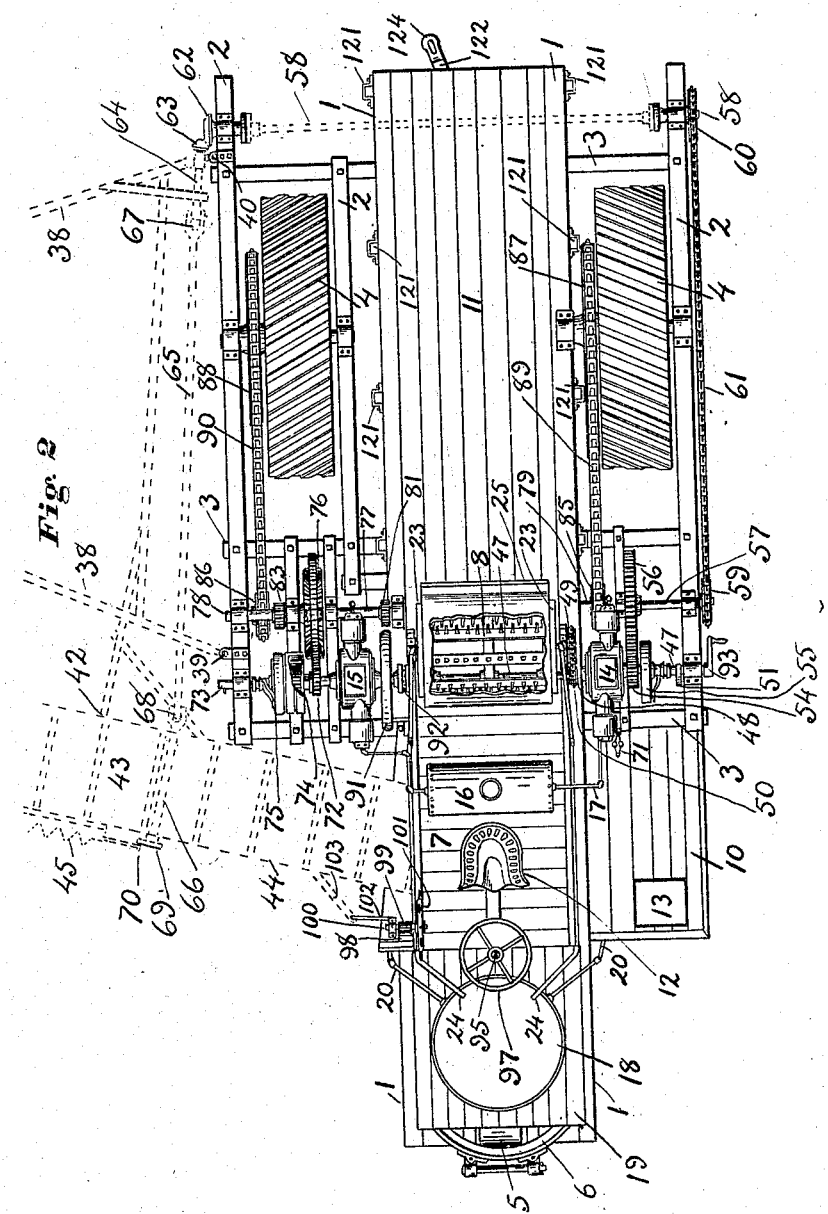

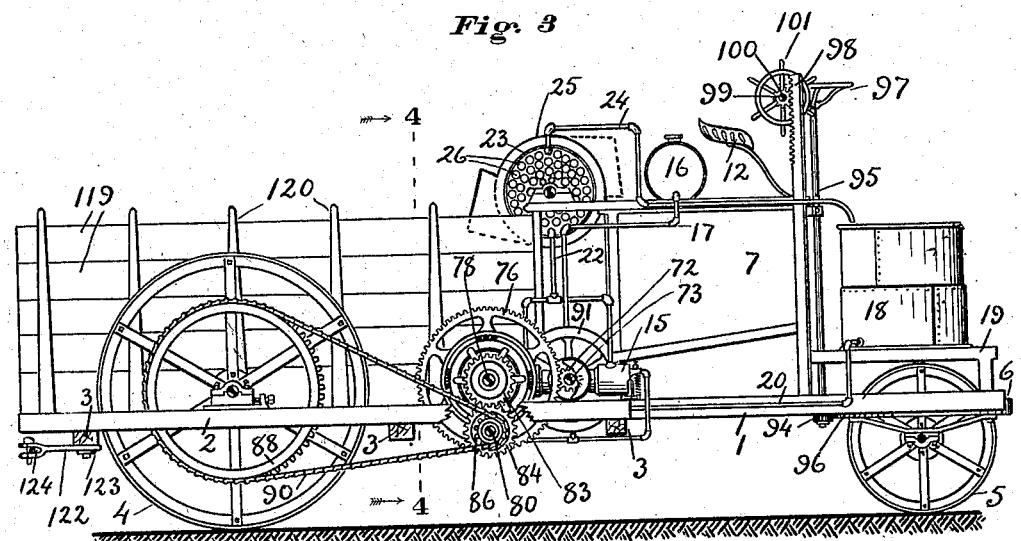
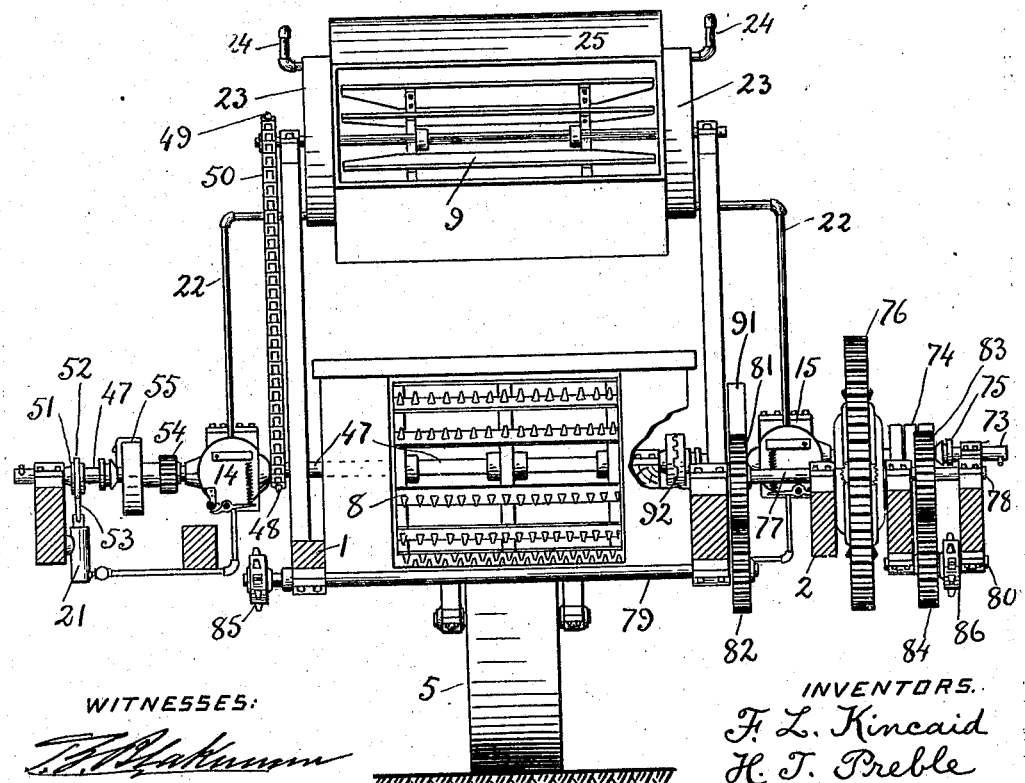

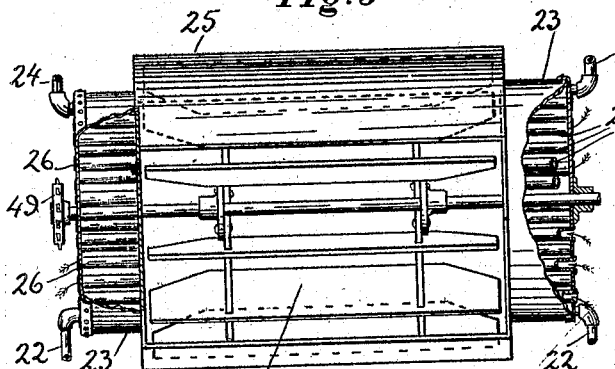
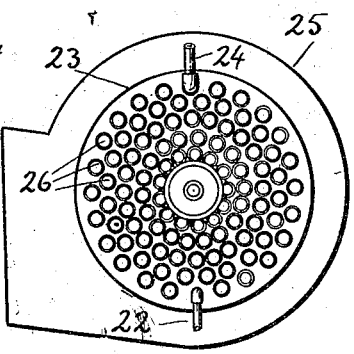
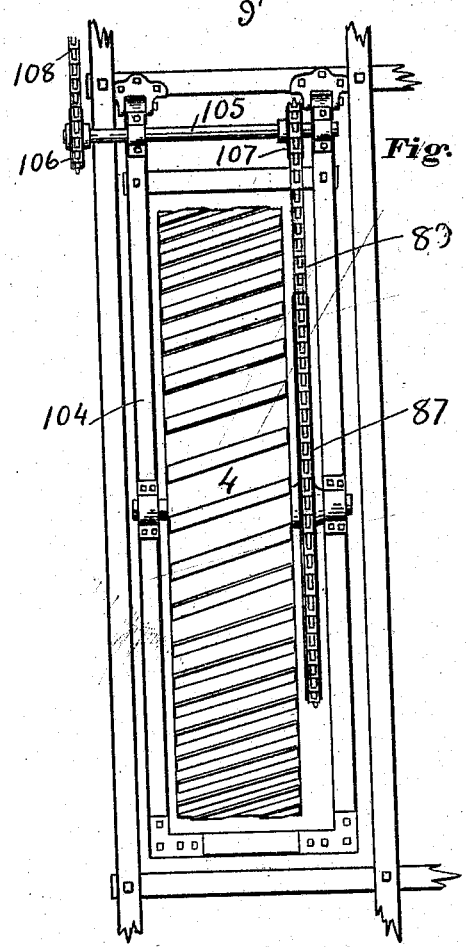
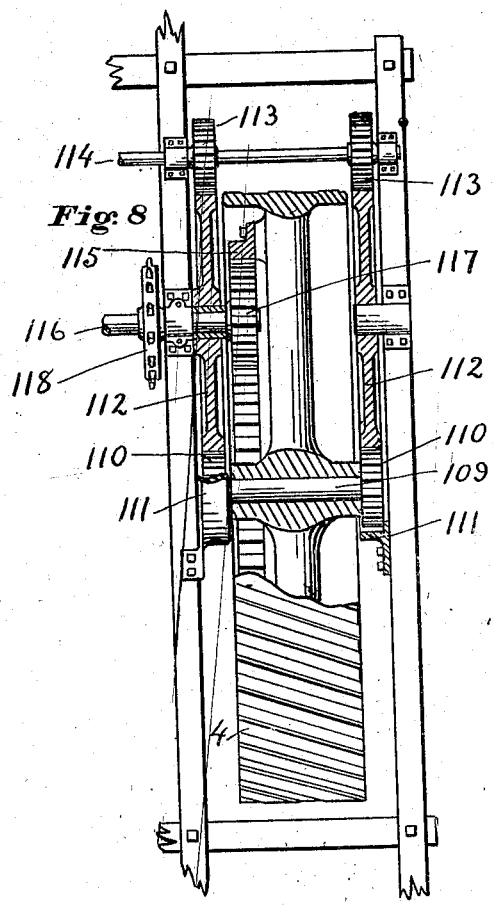

FRED L. KINCAID AND HENRY TURNER PREBLE, OF STOCKTON, CALIFORNIA.

SELF-PROPELLING COMBINED HARVESTER, AGRICULTURAL ENGINE, AND TRUCK.

No. 900,389.  Specification of Letters Patent.  Patented Oct. 6, 1908.

Application filed August 31, 1905. Serial No. 276,627.

*To all whom it may concern:*

Be it known that we, FRED L. KINCAID and HENRY T. PREBLE, citizens of the United States, residing at Stockton, in the county of San Joaquin and State of California, have invented a new and useful Self-Propelling Combined Harvester, Agricultural Engine, and Truck, of which the following is a specification, reference being had therein to the accompanying drawings.

This invention aims to provide an improved agricultural implement or apparatus embodying an appropriate collection of instrumentalities, which by judicious addition or subtraction can be advantageously combined with one another in several ways for the performance of general work on a farm, so that the same may be availed of in season for accomplishing one or two or more of an indefinite number of useful purposes.

Thus, one object of our invention is to provide a locomotory vehicle that can be used for drawing the tilling and seeding machinery across the field or for hauling the crop to market or for transportation generally.

Another object is to make the same implement convertible into a harvester or combined header and thresher, by the addition of suitable machinery.

Another object is to equip the apparatus with two engines operable singly or together, in such a way that one can be utilized for traction or propulsion, and the other for operating the harvester, or the two may be joined and become available both for traction.

Another object is to utilize the cylinder of the thresher as a fly-wheel for both of these engines, or for both of them when coupled.

Another object is to adapt one or more of the fans of the thresher for cooling the water used in connection with the engines.

With these and other objects and advantages, all of which will be quickly perceived, the invention consists in the improved construction and novel arrangement of parts hereinafter set forth and claimed.

In the accompanying drawings, Figure 1 is a left-hand side elevation of a practically complete machine, illustrating one embodiment of our invention, which in this instance includes a combined header and thresher. Fig. 2 is a top plan of the same, without the thresher, and with only part of the header (shown in dotted lines to indicate that it also is removable). Fig. 3 is a right-hand side view, showing the invention without either the header or thresher and adapted for use as a truck, with sides boarded up. Fig. 4 is an enlarged cross section on the line 4—4 of Fig. 3, looking forward, some of the parts being omitted to avoid confusion. Fig. 5 is a partly-broken rear elevation of the water-cooling contrivance, which also is shown on an enlarged scale. Fig. 6 is an end view of the same. Figs. 7 and 8 are plan views of different means for varying the position of the main wheels of the truck vertically with relation to its bed or frame, to adapt the machine for use on hillsides or upon uneven ground.

In constructing a machine in accordance with our invention a frame is formed from two main sills or timbers, both designated by the numeral 1, and auxiliary side sills 2, which are held in position by a suitable number of cross pieces, as 3. This frame is mounted at its rear end upon two wheels 4, which are the main bearing wheels and are placed between the said sills, one on each side; and at its forward end the said frame rests on a single wheel 5, which is arranged to revolve in a turn-table 6, so that it can be veered to guide the machine in the desired direction. Upon the same frame, forwardly, are located a few parts of the thresher, which on account of their constant serviceableness we prefer to keep and use as fixtures or permanent parts of the machine, and which include a feeder-house 7; a threshing cylinder 8 at the rear end thereof; a cleaner-fan 9 above the said cylinder; and a platform 10 for the sack-sewer, on the left of the feeder-house. From this house rearward extends another platform 11, which is laid centrally and constitutes the bed (or principal portion of the bed) of the truck comprised in the invention. The driver's seat (12) is placed on top of the feeder-house, at its forward end; and a "combination" seat and tool-box 13 is likewise provided forward for the use and convenience of the sack-sewer, down on the platform 10. The elements thus far enumerated make up the truck and part of its equipment.

Two motors or engines 14 and 15 are mounted upon the aforesaid truck-frame, one by each side of the feeder-house, at its rear end. These may be of any suitable type, though we believe that in most cases gasolene-engines will be preferred for general work, and therefore we have shown gasolene-engines in the accompanying drawings. The gasolene is stored in a fuel-tank 16, located on top of the feeder-house to insure proper fall, and thence is supplied to the engines' cylinders through downwardly - extending pipes 17, connected with any suitable form of vaporizer or carbureter.

The water for cooling the engines (or supplying their boilers if steam be used) is carried in a tank 18, placed on a platform 19, in front of the feeder-house and above the lead or guide wheel 5, over which this platform extends and is supported from the main sills of the truck-frame. From the tank 18, the water is conveyed by pipes 20 to the jackets of the engines and circulated therethrough with the aid of a pump 21, and thence is forced up through pipes 22 into radiators or coolers 23, and out of the latter back into the water-tank through return-pipes 24. See Figs. 1, 3 and 4. One radiator 23 is placed in each end of a circular casing 25, which is the casing of the cleaner-fan and is located adjacent to the rear of the top of the feeder-house. Each of these radiators consists, as detailed in Figs. 5 and 6, of a stanch drum whose heads are perforated and joined by several concentric series of short tubes 26, passing through opposite perforations and tightly fitted therein to leave the drum water-tight. The tubes all lie parallel with the longitudinal axis of the casing 25, and as their respective drums are made to close the ends of the said casing they therefore constitute the air-inlets to the fan within. This fan, as is well known, is a rotary fan and is employed with the view of furnishing wind in sufficient quantities to clean the grain as it is run through various sieves in the cleaner of the threshing apparatus. The location of the cleaner is indicated by the reference-numeral 27 in Fig. 1. Now it is apparent, since all the air which the fan can draw must first pass through the aggregate of tubes 26 and the fan keeps up a constant blast, that these tubes are maintained in a chilly atmosphere, which operates to cool the water circulating around them in the drums and to cause the same to return to the water-tank and again to the engines at a correspondingly low temperature. The outlet of the fan or fan-casing has been shown as directed rearward in Figs. 1, 2 and 3, which is its normal position for discharging the blast into the cleaner, but it is not intended that the casing of the fan should be immovable and consequently when the cleaner is removed the outlet may be turned in any other suitable direction, as the dotted lines in Fig. 3 sufficiently indicate.

Our invention contemplates the use of any suitable type of thresher (or separator as the same is otherwise called), either independently of or in conjunction with the grain-cutting apparatus, as may be preferred. We have shown in the drawings the form of thresher that is ordinarily combined with a header and employed in sections of the country, as in California and other States of the Pacific coast, where the grain can be threshed immediately after it is cut, and in fact is run directly from the cutting into the threshing apparatus. Besides the several parts hereinbefore mentioned and referred to either as removable or non-removable from the truck, this form of thresher comprises all the usual appliances for taking care and disposing of the grain proper, as well as dividing and liberating it from the straw and chaff. Among the latter, for instance, are included the grain-carrier, grain-elevator, return-elevator, grain-box, and fans (other than the previously-mentioned cleaner-fan) respectively located at 28, 29, 30, 31, 32, 33, and 34, Fig. 1, to which we have added an extra conveyer or straw-carrier 35 and an extra fan 36, in the rear end of the separator. The conveyer 35 has diverting boards 37 for changing the direction of the wind from the fan 36, and taken in connection with this fan constitutes an additional separating device. All the fans but the cleaner-fan 9, it will be observed, are removed with the main portion of the thresher or separator, and this is our reason for associating the cleaner-fan with the above-described radiators, though no limitation of our invention is intended in this respect. It is evident that any of the four other fans could be utilized in combination with the radiators, only the cleaner-fan being in the most favorable position to be detached from the body of the thresher and permanently remain on the truck is better suited to the purpose.

Any desirable form of header or other grain-cutting apparatus is meant to be included in our improved machine, and the same may be used singly or in combination, as is the case with the thresher. Our invention provides both a cutting apparatus and a threshing apparatus, for use either alone or combined. As the header may be of ordinary construction, it is only partly shown in the accompanying drawings, a side view of it being seen in Fig. 1, and a partial plan in dotted lines in Fig. 2. It comprises an A-frame 38, connected at its base with the right sill 2 of the truck by means of hinges 39 and 40, and resting at its apex on a supporting wheel 41, placed approximately in line with the main bearing wheels 4. From this A-frame forwardly is suspended, also by suitable hinges, a cutter-frame 42, which is balanced in the known manner so that it can be kept at the desired height, and in which runs a draper 43, that carries the cut grain up a spout 44, into the feeder-house 7. The frame 42 is provided with the usual sickle-bar 45.

Of the two engines hereinbefore mentioned, the one on the left, 14, is employed for operating the cutting, threshing, and related devices, and that on the right, 15, for moving the machine as a whole, forward or backward; and, as previously stated, both engines are capable of being coupled for traction purposes.

With the engine 14 is connected the cylinder 8 of the threshing apparatus, the shaft of which is a continuation of the shaft 47 of this engine (Figs. 2 and 4). The threshing cylinder, as is well known, must be quite heavy, properly balanced, and always running at high speed. Its coupling therefore with the engine, by a positive connection, makes an apposite combination, in that the power is directly applied from the engine to the threshing cylinder, and in turn the threshing cylinder equalizes the motion of the engine by acting as a fly-wheel to the same. It is believed to be an entirely novel feature of our invention to thus combine one engine or, if coupled, the two engines with the threshing cylinder, by placing them in direct line, substantially as shown, and joining and working them together, so that they become valuable accessories or associates of one another, and the additional weight and cost of at least one fly-wheel are dispensed with. The cleaner-fan 9 and the pump 21 are also permanently and operatively connected with the engine 14, the former by means of sprocket-wheels 48, 49, and a sprocket-chain 50, and the latter through the medium of an eccentric 51, a collar or strap 52, and a connecting-rod 53 (Figs. 1, 2 and 4). The cleaning and separating devices, other than the cylinder 8 and fan 9, are driven from the same engine, but through the agency of a pinion 54, loosely mounted on the shaft 47, which pinion is controlled by a clutch 55, and meshes with a gear-wheel 56, on a countershaft 57. The shaft 57 connects with rear shafting 58, by means of sprocket-wheels 59, 60, and a sprocket-chain 61, and thence are run the said cleaning and separating devices, through the customary belt-gearing (part of which is shown in Fig. 1). The sickle-bar or the cutting apparatus is likewise actuated from the engine 14, through approved connections, including bevel-gears 62, 63, a line of shafts 64, 65, 66, united by universal joints 67, 68, a rotary-disk 69, and a wrist-pin 70 (Figs. 1 and 2). Other connections, familiar to persons conversant with the art to which our invention appertains, are similarly made use of to actuate the other movable parts carried by the header. A governor 71 is attached to the engine 14 to properly regulate its speed and thereby insure the even running of the several mechanisms which it drives. The central portion of the shafting 58 is shown only in dotted lines in Fig. 2, to indicate that usually it will be removed with the separator. The end sections of this shafting will likewise ordinarily be removed with the separator, as also the rear sprocket-wheel 60 and chain 61, when transforming the harvester into a truck. The shafting may be kept on, however, and utilized to operate a broadcast seed-sower or for other purposes.

Connection between the bearing wheels 4 and the engine 15, to move the machine forward or backward, is made as illustrated in Figs. 1 to 4, to wit: A pinion 72 is mounted loosely on the shaft 73 of the engine 15, and this pinion is adapted to be driven at variable speeds in relation to the shaft 73 by planetary gearing and clutches, such as are indicated at 74 and 75, for instance. The same pinion is also adapted to mesh with equalizing gears 76, provided on the adjoining ends of a pair of countershafts 77 and 78, mounted rearwardly of the engine-shaft 73, about on a level therewith. Under these countershafts are other shafts 79 and 80, respectively connected with them by means of gear-wheels 81, 82, 83 and 84, and the last named shafts carry in addition small sprocket-wheels 85 and 86, one on each. Larger sprocket-wheels 87 and 88 are provided on one side of each of the bearing-wheels 4, directly in line with the sprocket-wheels 85 and 86, and sprocket-chains 89 and 90 are respectively passed around the alined sprocket-wheels, namely, 89 around 85 and 87, and 90 around 86 and 88, whereby the said bearing wheels are given a positive motion in either direction. This arrangement, it will be observed, admits of the two bearing wheels being actuated from a single or uniform source of power while they may revolve at different rates of speed, as in moving in other than a straight line. The engine 15 is furnished with the usual fly-wheel 91, to assist it in maintaining the proper regularity of speed when used alone for purposes of traction, that is to say, when disconnected from the engine 14 and the thereto attached threshing cylinder 8.

A clutch 92 (Figs. 2 and 4) is provided to couple the two said engines, when it is desirable that they should run as one, for instance, when hauling heavy loads. The members of this clutch are respectively placed on the abutting ends of the shafts 47 and 73, and arranged for operation in the usual manner so that the engines may be connected or disconnected at will. Either engine may be started by means of a crank 93, shown in Fig. 2 as being applied to the shaft 47. When the engines have been started, and the proper speed has been developed, it is an easy matter to place the operative parts of the machine each in clutch with the working pinion of its respective engine,—that is to say, the threshing and cutting apparatus by means of the clutch 55, and the traction mechanism, either forward or backward, by means of the clutch bands on the planetary gears 74. The several mechanisms, it is understood, could all be driven by or from a single engine of adequate size, but we prefer using two engines, because less cumbersome and of greater convenience in manipulation, besides affording a distinct advantage in the distribution of weight and strain on the frame of the machine. We also prefer locating these engines in the places which we have assigned to them, that is, by the sides (or ends) of the threshing cylinder, while we place the bearing wheels further back than is usual from the latter, as by so doing we gain, among other advantages, a marked preponderance of weight forward (about 25%), which is beneficial in that it prevents the machine from tipping up in front and renders it much safer to operate on that account, particularly on upwardly-trending surfaces.

We may use any suitable mechanical means for turning the forward wheel 5, in order to guide the machine in the desired direction. One such means is illustrated in Figs. 1, 2 and 3, wherein a pinion 94, keyed to the lower end of a vertical shaft 95, is shown as engaging gear-teeth 96 on the turntable 6, within which the said wheel is mounted. The shaft 95 projects upwardly in front of the driver's seat 12 and carries on its upper end a hand-wheel 97, by means of which the driver can rotate it to the right or left as may be required. Or any convenient connection may be provided between the forward wheel and either engine wherewith the same will operate to steer the machine as needed. Upon the driver also properly devolves the duty of raising or lowering the cutter-frame of the header, to adjust it to the varying height of the grain. This he can conveniently accomplish by means of a vertically-running rack-bar 98, engaged by a pinion 99 on a shaft 100, which is provided with a spoke-wheel 101, and is mounted by the side of the seat 12, substantially as shown in Figs. 1, 2 and 3. The lower end of the rack-bar is suitably connected with the cutter-frame by a rod, as 102, hinged to a diagonal timber 103, rigidly secured to the said cutter-frame.

Where it is desired to have the machine adapted for use upon hillsides or uneven ground, the bearing wheels 4 are mounted or connected so that they can be moved in opposite directions in their respective vertical planes independently of the main frame, while the latter will be kept in a plane parallel with the horizon. A common form of construction for this purpose is partly shown in Fig. 7, where 104 indicates a supplemental frame in which one of the bearing wheels is mounted, instead of upon the sills of the main frame as represented in Fig. 2, and which supplemental frame is pivotally connected with the main frame at one end, in such a way as to admit of being swung up or down with the wheel therein, by means of any suitable type of raising and lowering mechanism. The driving connections for the bearing wheel 4, in this construction, are substantially the same as were before described, with the addition of an intermediate shaft 105, carrying sprocket-wheels 106 and 107, one of which is driven by a supplemental chain 108, and the other of which drives the chain 89. Fig. 8 partly illustrates another well-known construction for the same purpose, in which the bearing wheel 4 is loosely mounted on its axle 109, and the axle is journaled at each end on a movable box 110, having peripheral gear-teeth and engaged on opposite sides by a segmental rack 111 and a gear-wheel 112, through which the main frame of the machine is adjustably supported upon or from the bearing wheel. The gear-wheels 112 are actuated each by a pinion 113, keyed to a shaft 114, which is rotated by suitable mechanism, including an internal gear 115 on the bearing wheel, and a shaft 116, having a pinion 117 in mesh with the said internal gear, and also carrying a sprocket-wheel 118 adapted to drive some intermediate shafting (not shown).

To adapt it for transporting grain or other produce, the truck part of the machine is fitted with side boards 119, as represented in Fig. 3, which boards are suitably fastened to stakes 120, inserted in staples 121, shown in Fig. 2. But the truck may be used without either the boards or the stakes, if preferred. The truck is further provided with a draw-bar 122, pivotally secured at its inner end to a rear timber, as at 123, and having at its outer end a clevis 124, as seen in Figs. 1, 2 and 3, for the purpose of hitching thereto other farming implements, such as gang-plows, harrows, trailing wagons, and so on.

Besides its adaptability to hauling or transporting articles of a portable nature on, to, or from a farm, and its capability of use there as a cultivator, in the broadest sense of the term, or as a crop-gatherer, in the manner above described, it is manifest that our improved machine also has the capacity of performing work in stationary positions, in or about farm buildings, where, for example, its power can be utilized for pumping water, sawing wood, grinding feed, and generally doing much of the work that falls to the lot of people engaged in agricultural pursuits.

The above-described machine can be successfully operated, in its most complete form as a traveling harvester, with three men, namely, a driver to guide the machine and raise and lower the cutting apparatus in accordance with the height of the grain to be reaped, a sack-sewer to take care of the grain as it is being threshed and cleaned, and an engineer to look after the mechanical organism and supervise the work. In an emergency, the driver or the sack-sewer, if otherwise competent to act, could discharge the duties of the engineer, so that the machine would then be run by only two men. The old style combined headers and threshers require a larger crew to man them, besides some thirty to thirty-six horses to draw them over the field, with relays of proportionate magnitude, and they can be used on an average but thirty days in the year. With a self-propelled harvester, convertible into a truck, etc., as herein described, it is no longer necessary to keep, feed, care for, and harness any such number of horses on a single farm or ranch, and some part or another of the machine, if not the whole, is capable of use every working day throughout the year. The saving and gain are apparent. Irrespective of its potential conversion into a locomotory vehicle, or other implement, and of the material reduction which it effects in running expenses, the mechanically-driven harvester is still preferable to the machine of the same class drawn by horses, to the extent that it does its work in a more uniform, thorough, and satisfactory manner. To particularize, it is a distinct advantage in operating a harvester to be able to travel at various rates of speed according to the density or sparsity of the grain to be cut, while running the threshing apparatus at a normal unvarying speed; and at times to halt without stopping the thresher; and at other times to back up, as in getting away from thick lodged grain that bunches on the sickle or clogs the cutter. All of this is accomplished easily with our machine, but nothing of the sort can be done with a harvester drawn by horses, as there is no means provided in such a harvester for maintaining, altering, or regulating the respective velocities of the cutting and threshing devices independently of the tractive power and rate of motion of the machine, or for operating the thresher when the machine is standing still, or for reversing the harvester.

We are aware that engines have already been used for doing work on farms, such as winding ropes of power plows, operating stationary threshers, and the like. In all instances that we know of, however, the engine was separate from the implement or apparatus which it was employed to drive, so it amounted to using two separate machines to do the work in each instance. Therefore, while we have no intention nor desire of posing as the originators of the application of power to farm machinery, we believe we have been the first to devise a self-contained farming machine which carries its motive power on its own frame, and which can be added to or taken from and made to serve in various capacities by simple transformation or metamorphosis from one form of implement or apparatus into another.

What we claim, and desire to secure by Letters Patent of the United States, is

1. A machine of the class described comprising a truck provided with a guide wheel in front and bearing wheels at the rear, two motors mounted on the truck, means for connecting either one or both of the motors with the bearing wheels, a threshing cylinder located upon the truck, and means operatively connecting the threshing cylinder with the motors.

2. A machine of the class described comprising a truck provided with a guide wheel in front and bearing wheels at the rear, a propelling means, a feeder house at the forward end of said truck, a seat on top of the said feeder house, and steering mechanism for said guide wheel located adjacent to said seat.

3. A machine of the class described comprising a self moving truck having a platform, detachable elements carried thereby, a draw-bar at the rear, and a coupling attached to the draw-bar, said bar and coupling lying under the detachable elements specified.

In testimony whereof we affix our signatures in presence of two witnesses.

FRED L. KINCAID. [L. S.]
    HENRY TURNER PREBLE. [L. S.]

Witnesses:
    ANNA P. GRUNSKY,
    F. J. DIETRICH.